United States Patent
Bernth et al.

(10) Patent No.: US 6,285,978 B1
(45) Date of Patent: Sep. 4, 2001

(54) SYSTEM AND METHOD FOR ESTIMATING ACCURACY OF AN AUTOMATIC NATURAL LANGUAGE TRANSLATION

(75) Inventors: Arendse Bernth, Ossining, NY (US); Claudia Maria Gdaniec, Morristown, NJ (US); Michael Campbell McCord, Ossining; Sue Ann Medeiros, Hartsdale, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/159,966

(22) Filed: Sep. 24, 1998

(51) Int. Cl.[7] ............................. G06F 17/28; G06F 17/27
(52) U.S. Cl. ........................................ 704/7; 704/2; 704/6
(58) Field of Search ................................... 704/2, 3, 4, 5, 704/6, 7, 8, 277; 707/536

(56) References Cited

U.S. PATENT DOCUMENTS

| | | | |
|---|---|---|---|
| 5,175,684 | * 12/1992 | Chong | 704/3 |
| 5,418,717 | * 5/1995 | Su et al. | 704/9 |
| 5,510,981 | * 4/1996 | Berger et al. | 704/2 |
| 5,677,835 | 10/1997 | Carbonell et al. | 704/8 |
| 5,864,788 | * 1/1999 | Kutsumi et al. | 704/2 |
| 5,963,742 | * 10/1999 | Williams | 717/8 |
| 5,995,920 | * 11/1999 | Carbonell et al. | 704/9 |

FOREIGN PATENT DOCUMENTS 0 525 470 A2   2/1993  (EP) .

OTHER PUBLICATIONS

A. Bernth, "EasyEnglish: Preprocessing for MT", Proceedings of the Second International Workshop on Controlled Language Applications, Carnegie–Mellon University, pp. 30–41.
A. Bernth, "EasyEnglish: Addressing Structural Ambiguity", to be published in Proc. Third Conference of the Association for Machine Translation in the Americas.
M. McCord, et al "The LMT Transformational System".
"Concept of a Differentiated Text–Related Machine Translation Evaluation Methodology", http://222.concentric.net/~kspalink/MTNI.html.

A. Bernth, "EasyEnglish: A Tool for Improving Document Quality", Fifth Conference on Applied Natural Language Processing, Washington Marriott Hotel, pp. 159–165.
C. Gdaniec, "The Logos Translatability Index", Technology Partnerships for Crossing the Language Barrier, Proceedings of the First Conference of the Association for Machine Translation in the Americas, pp. 97–105.
M. McCord, "Slot Grammars", Computational Linguistics, vol. 6, pp. 31–43.
M. McCord, "Slot Grammar: A System for Simpler Construction of Practical Natural Language Grammars", R. Studer(Ed.), Natural Language and Logic: International Scientific Symposium, Lecture Notes in Computer Science, Springer Verlag, Berlin, pp. 118–145, 1990.
M. McCord, "Design of LMT: A Prolog–Based Machine Translation System", Computational Linguistics, vol. 15, No. 1, Mar. 1989, pp. 33–52.
M. McCord, et al "The Lexicon and Morphology for LMT, A Prolog–Based Machine Translation System", IBM Research Report RC 13403, 1988.
G. Arrarte, et al Spanish Generation Morphology for an English–Spanish Machine Translation System, IBM Research Report RC 17058, 1991.
M. McCord, "LMT", Proceedings of MT Summit II, pp. 94–99.
H. Lehmann (1995), "Machine Translation for Home and Business Users", Proceedings of MT Summit V, Luxembourg, Jul. 10–13.

* cited by examiner

Primary Examiner—Joseph Thomas
(74) Attorney, Agent, or Firm—Louis J. Percello

(57) ABSTRACT

A computer system and method for natural language translation uses a translation process to translate a source natural language segment (e.g. English) of one or more source words/elements into a target natural language (e.g. German) segment of one or more target words/elements. An evaluation module determines a confidence measure of the natural language translation. Typically, the confidence measure indicates less confidence as the complexity of the translation increases. Various novel features for determining complexity and confidence measure at different steps in the translation are used. The translation process can be terminated if the confidence measure fails to meet a threshold criterion.

29 Claims, 9 Drawing Sheets

SYSTEM AND METHOD FOR ESTIMATING ACCURACY OF AN AUTOMATIC NATURAL LANGUAGE TRANSLATION

FIELD OF THE INVENTION

This invention relates to the field of automatic natural language translation. More specifically, the invention relates to a method and system for automatically estimating the accuracy of translations by an automatic translation system.

BACKGROUND OF THE INVENTION

Perfect and automatic translation between two natural languages, i.e. a source natural language and a target natural language, by a computer is highly desirable in today's global community and is the goal of many computational systems. Here natural language can be any language that is written (textual) or spoken by humans.

One of the main methods for producing automatic translation is the transfer-based method of Machine Translation. A transfer-based MT system typically takes a source text (the text in the original natural language, e.g. English), segments it into natural language segments (e.g. sentences or phrases) which we abbreviate as "segments", and performs source analysis, transfer, and target generation to arrive at the target text (the translated text).

Source analysis can be performed in any one or more well-known ways. Typically, source analysis is dependent on a syntactic theory of the structure of natural language. For example, in rule-based grammars there are rules for the natural language structure, and they are used by the source analysis to parse the given natural language text or input into one or more parse structures. For example, in the rule-based grammar system Slot Grammar, there are rules for filling and ordering so-called slots; slots are grammatical relations, e.g. subject, direct object, and indirect object. A further explanation of source analysis is given in McCord, M. C. "Slot Grammars," *Computational Linguistics,* vol. 6, pp. 31–43, 1980 and McCord, M. C. "Slot Grammar: A System for Simpler Construction of Practical Natural Language Grammars," in R. Studer (Ed.), Natural Language and Logic: International Scientific Symposium, Lecture Notes in Computer Science, Springer Verlag, Berlin, pp. 118–145, 1990, which are herein incorporated by reference in their entirety.

The source analysis produces a parse structure that is a formal representation of one of the source segments. The parse structure includes elements like word senses (e.g. choice between homonyms), morphological features (such as parts of speech), surface syntactic structure, and deep syntactic structure, and relates these elements to one another according to the rules of the grammar (e.g. syntactic and semantic relationships) used to parse the given natural language input. Parse structures such as those of Slot Grammar may also include information on such things as punctuation (e.g. occurrences of commas and periods), and formatting tags (e.g. SGML tags).

The transfer step typically transfers the source elements from the source natural language to target elements in the target natural language, producing an initial transfer structure. The transfer step then iteratively performs structural transformations, starting with the initial transfer structure, until the desired syntactic structure for the target language is obtained, thus producing the target structure. A further explanation of transfer is given in M. C. McCord, "Design of LMT: A Prolog-based Machine Translation System", *Computational Linguistics,* vol. 15, pp. 33–52, which is herein incorporated by reference in its entirety.

The target generation step typically inflects each word sense in the target structure, taking into account the inflectional features marked on each word, and then outputs the resulting structure as a natural language sentence in the target language. A further explanation of target generation is given in M. C. McCord and S. Wolff, "The Lexicon and Morphology for LMT, a Prolog-based MT system," IBM Research Report RC 13403, 1988, and G. Arrarte, I. Zapata, and M. C. McCord, "Spanish Generation Morphology for an English-Spanish Machine Translation System," IBM Research Report RC 17058, 1991, which are herein incorporated by reference in their entirety.

LMT is an example of a transfer-based MT (machine translation) system, and it uses steps like those outlined above to translate a natural language text. The McCord reference ("Prolog-based Machine Translation") gives an overview of these steps for translating a sentence from English to German.

In the preceding reference, the example sentence is: The woman gives a book to the man. The source parse structure shows how the various parts of the sentence fit together: The head of the sentence is the verb gives, which has the morphological features third person, singular, present, and indicative. The verb gives has three slots, subject, which is filled by the word sense woman, object, which is filled by the word sense book, and prepositional object, which is filled by the word sense man.

Next, the initial transfer structure shows the structure right after lexical transfer. Each word sense in the source parse structure has been transferred to the corresponding German word sense, e.g. the English woman has been transferred to German frau. In addition, the correct transfer features have been marked on each word, e.g. the subject is marked nominative, and the object is marked accusative. The order of the words in the initial transfer structure is the same as in the source parse structure.

Then a transformation applies to the initial transfer structure to produce the target language structure that represents the correct word order for German. The transformation moves the indirect object noun phrase the man from its position after the object, the book, to a position before the object, thus producing a target language structure with word order like that in The woman gives the man a book.

Finally, each word sense in the tree is inflected as required by its features, and the result of the translation output as a string with appropriate capitalization and punctuation: Die Frau gibt dem Mann ein Buch.

A further explanation of LMT is given in M. C. McCord, "LMT", *Proceedings of MT Summit II,* pp. 94–99, Deutsche Gesellschaft für Dokumentation, Frankfurt, and in H. Lehmann (1995), "Machine Translation for Home and Business Users", *Proceedings of MT Summit V,* Luxembourg, July 10–13, which are herein incorporated by reference in their entirety.

STATEMENT OF PROBLEMS WITH THE PRIOR ART

Natural languages are very complex, and this poses great challenges for any MT system. No MT system today is able to produce perfect translation of arbitrary text. For any given system, translations range from almost perfect to unintelligible, and the user is not given any indication of how good the translation may be.

Bad translations cause a high degree of frustration for the user, because the prior art fails to effectively measure the accuracy of the given translation. If the user could know that the translation was likely to be bad, the user would have the choice not to look at it.

The Logos Translatability Index (TI) assigns a measure of the translatability of a complete document by the LOGOS system. The Logos Translatability Index was not expected to "provide sentence-specific information with any degree of reliability. The TI applies to the corpus or document as a whole but is not useful in pinpointing problem sentences." See C. Gdaniec: "The Logos Translatability Index", *Proc. First Conference of the Association for Machine Translation in the Americas,* pp. 97–105, AMTA, 1994, which is herein incorporated by reference in its entirety.

Any step in the translation process may introduce wrong data that will result in bad translation quality, and it is a weakness of existing translation systems that processing continues past the point where such wrong data is introduced.

In order to guarantee high quality of the translation, some systems, e.g. The Integrated Authoring and Translation System (U.S. Pat. No. 5,677,835) which is herein incorporated by reference in its entirety, require that the source text be constrained severely. Not only does this place a considerable burden on the author, but it also means that documents that are not specially prepared cannot be handled. Another system, EasyEnglish, is described in A. Bernth (1997): "EasyEnglish: A Tool for Improving Document Quality", *Proc. Fifth Conference on Applied Natural Language Processing,* Association for Computational Linguistics, pp. 159–165; A. Bernth (1998): "EasyEnglish: Preprocessing for MT", *Proceedings of The Second International Workshop On Controlled Language Applications,* Carnegie-Mellon University, pp. 30–41, Pittsburgh; and A. Bernth (1998): "EasyEnglish: Addressing Structural Ambiguity", to appear in *Proc. Third Conference of the Association for Machine Translation in the Americas,* all of which are herein incorporated by reference in their entirety. EasyEnglish is a pre-editing tool, which helps the writer prepare a document for machine translation by pointing out hard-to-translate constructions. This system does not require severe constraints, but it neither guarantees a perfect translation nor gives an indication of how well the source text would translate.

The problems in automatic translation and hence the confidence in the quality of the translation obviously depends on the language pair in question. The prior art fails to provide a tool for customizing the confidence estimate for a specific language pair.

OBJECTS OF THE INVENTION

An object of this invention is a system and method that estimates the confidence (confidence measure) in the correctness of automatically produced translations of an arbitrary natural language text.

Another object of this invention is to provide this confidence measure for one or more natural language segments in an arbitrary natural language text.

Another object of this invention is to provide a mechanism for a threshold criterion for translation acceptance.

Another object of this invention is to terminate the translation process if the confidence measure fails to meet the threshold criterion.

Another object of this invention is to provide a mechanism for customizing a rule system for estimating the confidence measure for a particular user (user profile).

SUMMARY OF THE INVENTION

The present invention is an improved computer translation system and method for natural language translation.

Generally, the translation system translates a source natural language segment (e.g. English) of one or more source words/elements into a target natural language (e.g. German) segment of one or more target words/elements. An evaluation process determines a confidence measure of the natural language translation at segment level. Typically, the confidence measure indicates less confidence as the complexity of the translation increases. Various novel features for determining complexity at one or more stages of the translation are used.

BRIEF DESCRIPTION OF THE DRAWINGS

The foregoing and other objects, aspects and advantages will be better understood from the following detailed description of preferred embodiments of the invention with reference to the drawings that include the following.

DETAILED DESCRIPTION OF THE INVENTION

Figure 1:
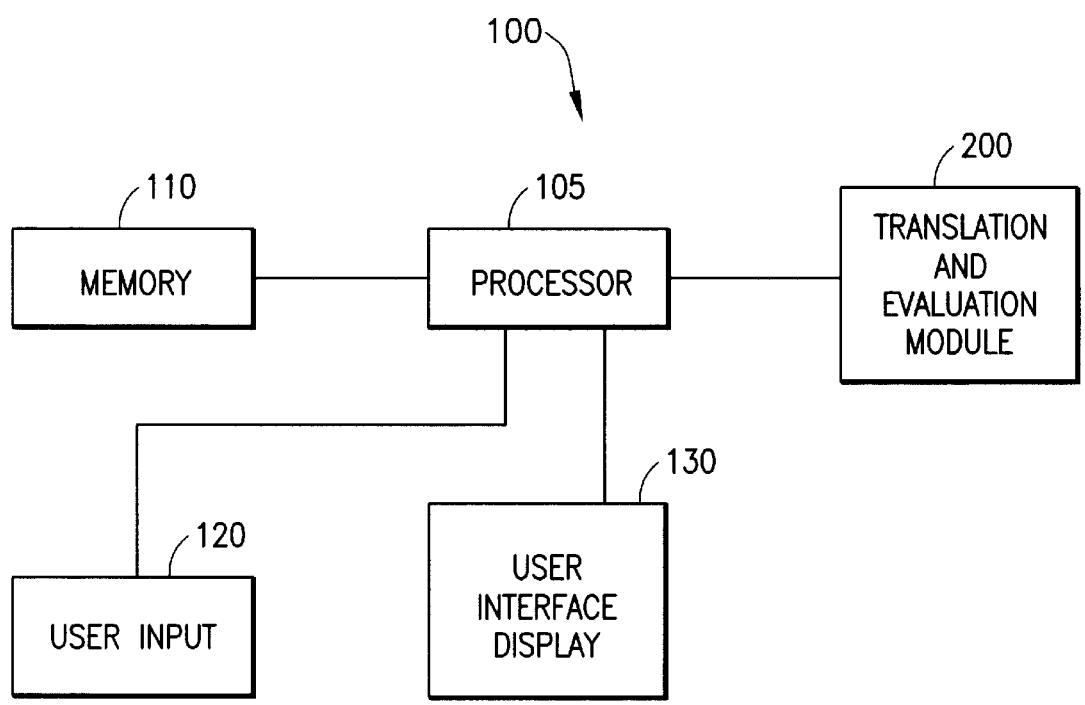
FIG. 1 is a block diagram representation of a computer system embodying the present invention.

FIG. 1 is a block diagram representation of a computer system 100 embodying one preferred embodiment of the present invention. The system 100 has one or more memories 110, one or more central processing units (CPUs) 105, one or more user interfaces (e.g. graphical user interfaces—GUIs) 130, and one or more user input devices (e.g. keyboard, mouse) 120. Systems 100 like this are well known in the art. One example would be an IBM Aptiva (a trademark of the IBM corporation).

In this system 100, the CPU(s) execute a novel process called the translation and evaluation module 200. This module 200 determines the complexity of a translation from one natural language to one or more other natural languages at one or more stages of the translation. This complexity and/or an aggregate of more than one of these complexities is used to produce a confidence measure of the confidence in the accuracy of the translation(s).

Figure 2:
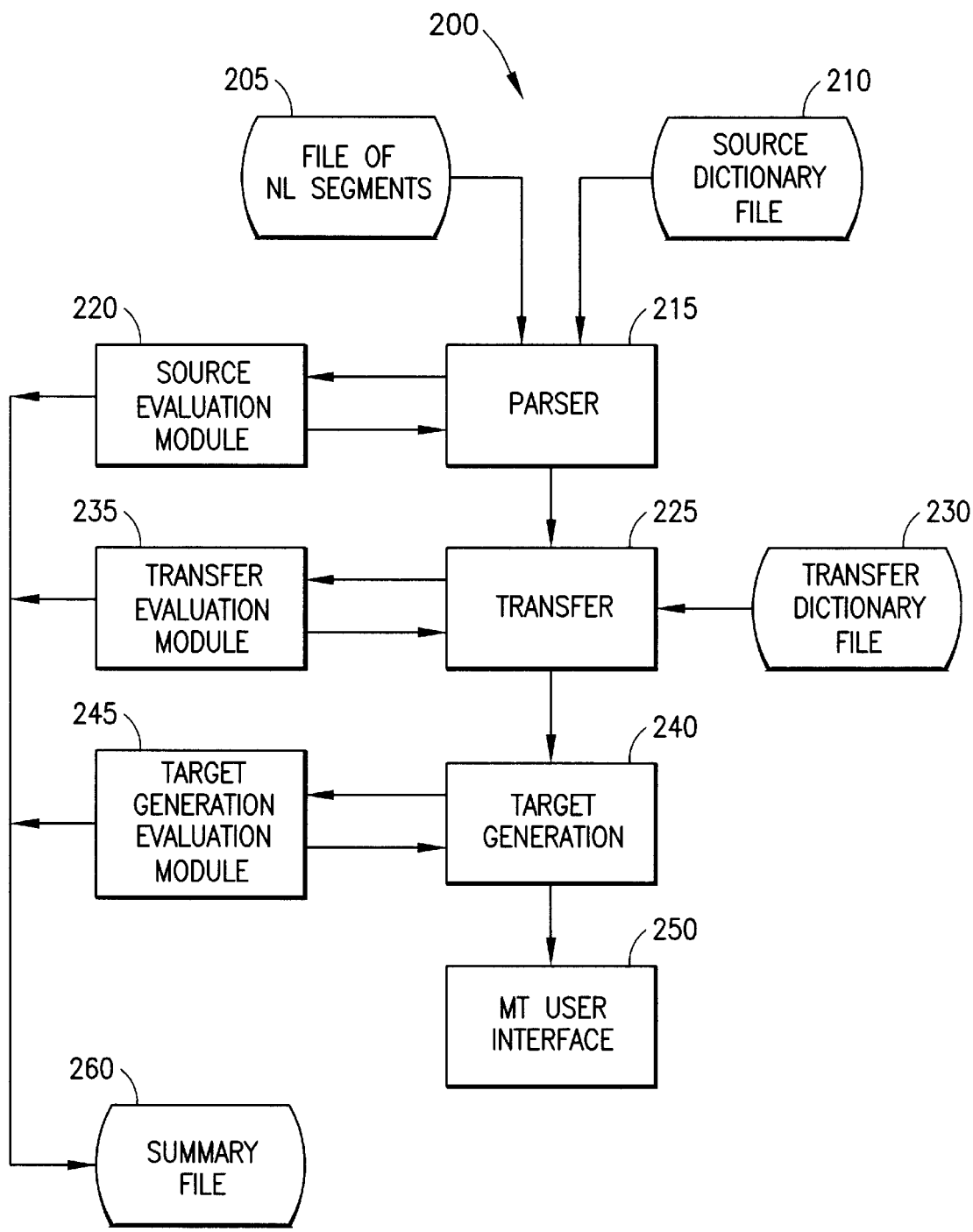
FIG. 2 is a logic flow and functional block diagram illustrating typical structure and data flow of a natural language translation in the translation and evaluation module of FIG. 1.

FIG. 2 is a logic flow and function block diagram showing the overview of the translation and evaluation module/process 200.

The translation and evaluation process 200 begins with one or more files of natural language (NL) segments 205. These segments are well known. Non-limiting examples of segments include: sentences of text and noun phrases that appear by themselves in e.g. document titles and chapter headings (either hard copy or electronic).

The translation and evaluation process 200 also has access to one or more source dictionary files 210 and to one or more transfer dictionary files 230. These files are well known and include information about the source words and the target words. An example of a possible entry in a source dictionary for the word demo is:

demo<*n*(*sn* demo1)<*v* obj(*sn* demo2)

Here demo has two analyses: the first is a noun analysis, and this analysis is given the sense name demo1. The second analysis, demo2, is a verb, which can take an object.

A possible corresponding entry in a transfer dictionary for translating from English to German is:

demo<demo1(demo*f i* 0)<demo2(*vor*:führ )

Here the demo1 sense is translated into the German noun Demo, which has the following morphosyntactic information: gender feminine, inflectional class i, and combining class 0. The verb sense, demo2, is translated into the verb vorführen.

It is also possible to combine the source and transfer dictionaries into one dictionary, like what is commonly found in a printed dictionary.

In a preferred embodiment, the information includes information for single source words as well as for idiomatic expressions comprising two or more source words called a source entry. Preferably, the information for each source entry includes citation form, part of speech, any gender, any other needed morphological information, and any possible complements. In a preferred embodiment, the information for the target words include translation of each source entry, any gender, any needed morphological information, and description of conditions under which a given source word translates into a given target word. For example, the English source word "bank" translates into the German word "Bank", which is of feminine gender, if it means a financial institution, and into the German word "Ufer", which is of neuter gender, if it means the side of a river. Source and transfer dictionary are preferably hand-coded in order to include all necessary information about the words.

A parser 215 takes as input one or more of the NL segments 205 and as required accesses the source dictionary file 210 to parse the NL segments into source elements that show word senses, morphological features (e.g. part of speech, gender, number, person), surface syntactic relationships (e.g. the attachment of phrases or which word is the surface subject or object) and deep syntactic relationships. For example, in the sentence The mouse was caught by the cat, mouse has the part of speech noun, the number singular, the person third person, and it is the surface subject of the verb was caught, which is a past passive tense of catch. The deep object is mouse since this is a passive sentence. The deep subject is the word cat. The parser combines these source elements into one or more complete source parse structures that show the relationships and other source information for the whole segment. This source parse structure is well known. In a preferred embodiment, the source parse structure is expressed as a network or tree structure. During parsing, the parser will encounter several choice points, e.g. the choice of part of speech and number for a word like level, which could be e.g. a noun in the singular, or a verb in the plural, or an adjective. In a preferred embodiment, the parser will apply one or more well known procedures for evaluating the parse and produce a parse evaluation score. Also the parser will produce numbers indicating the time and memory space used by the computer system 100 for the parsing process and a number indicating the length of the source segment. In a preferred embodiment, the source analysis has the use of a grammar and style checker such as EasyEnglish. In a preferred embodiment, the parser would be McCord's Slot Grammar Parser described in e.g. the McCord reference "Slot grammars".

The translation and evaluation process 200 optionally has a novel source evaluation module/process 220 (see the description in FIG. 4 below) that generates a source indication of the complexity of choices in producing the source parse structure. Non-limiting examples of the complexity of choices can include any combination of: a complexity of segmenting and tokenizing the text 405, a complexity of lexical choice 410, a complexity of parse evaluation 420, a complexity of time and space used by the parser 425, a complexity of ambiguous constructions and ungrammatical constructions 430, a complexity of other constructions that are known to be difficult to parse correctly 440, and a complexity of sentence length 450. In a preferred embodiment, the source evaluation module/process 220 has access to a summary file 260, where the source evaluation module/process 220 writes a summary of the complexities encountered during the source evaluation module/process 220. This summary file 260 can comprise any general memory structure (e.g. a list) and typically has one line per complexity giving the type of complexity as well as an indication of a severity of the complexity. The severity is given by the user in a user profile, typically a numerical weighting factor.

The translation and evaluation process 200 gives the source parse structure as input to a transfer process 225. Transfer is a well known process. The transfer process 225 as required accesses the transfer dictionary file 230 to produce an initial transfer structure from the source parse structure. Preferably, the initial transfer structure has the same word order as the original source structure, but each word has been translated into the target language, and features have been changed as required. To get the word order required by the target language, a structural process applies zero or more tree transformations and produces a target language structure. For example, in an MT process for English to German, the source parse structure for The cat has caught the mouse is first transferred into an initial transfer structure having German word senses, and then the structural process changes the word order to be as in The cat has the mouse caught. See McCord, M.C. and Bernth, A. "The LMT Transformational System", *Proc. Third Conference of the Association for Machine Translation in the Americas,* AMTA, 1998), which is herein incorporated by reference in its entirety, for examples of original source and transfer structures and application of transformations.

The translation and evaluation process 200 optionally has a novel transfer evaluation module/process 235 (see the description in FIGS. 5 and 6 below) that generates a transfer indication of the complexity of choices in producing the target language structure. Non-limiting examples of the complexity of choices can include one or any combination of: a complexity of lexical transfer 505, a complexity of lexicons 510, and a complexity of structural transfer 610. In a preferred embodiment, the transfer evaluation module/ process 235 has access to a summary file 260 (described above), where the transfer evaluation module/process 235 writes a summary of the complexities encountered during the transfer evaluation module/process 235.

The target language structure is given as input to a target generation process 240. This target generation process is well known. The target generation process inflects each word in the target language structure as required by the inflectional features marked on the word. For example, the German word kommen may be inflected to kommst if it has features verb, second person, singular, familiar, present tense, and indicative. A further explanation of target generation is given in the McCord and Wolff reference and the Arrarte et al. reference.

The translation and evaluation process 200 optionally has a novel target generation evaluation module/process 245 (see the description in FIG. 8 below) that generates a generation indication of the complexity of converting the target language structure into a target language segment. This complexity includes the complexity of target elements 810. In a preferred embodiment, the target generation evaluation module/process 245 has access to a summary file 260 (described above), where the target evaluation module/process 245 writes a summary of the complexities encountered during the target generation evaluation module/process 245.

An MT user interface 250 displays the target language segment. This is the final step in a translation process and is well known.

Figure 3:
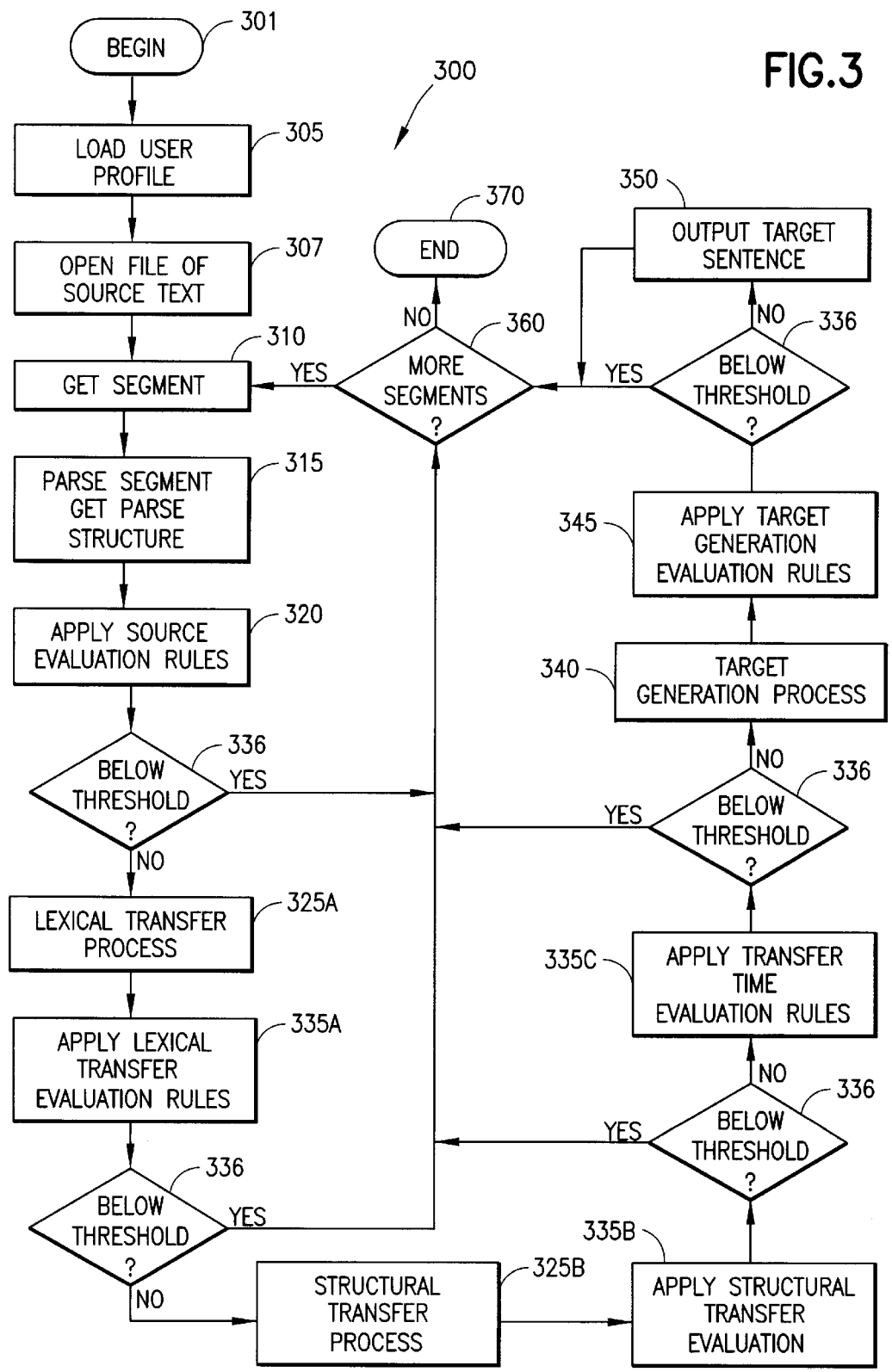
FIG. 3 is a flow diagram illustrating sequential operations (steps) of the present invention for applying natural language translation and evaluation rules.

FIG. 3 is a flow chart showing the sequential operations (process steps 300) of the translation and evaluation module/process 200.

The translation and evaluation process 200 optionally has a novel user profile. After beginning 301 (e.g. being called by a request to translate a document), a process 305 loads the user profile into the memory(s) 110 of the computer system 100 of the current invention. In a preferred embodiment, the user profile comprises one or more lines called profile settings. A profile setting has a name of a type of complexity and an associated value (e.g. a weight) indicating how much the given type of complexity contributes, e.g. negatively, to the confidence measure.

Next, a process 307 opens a file of source language text. This is a well known process. The process 307 can be implemented by using a well known call to a file open function of a well known programming language.

Next, a segmentation process 310 gets a segment of NL text from the file of source language text. This is a well known process. In a preferred embodiment, the segmentation process 310 segments the source natural language text into segments by looking at punctuation (e.g. periods and question marks) and at document formatting tags (e.g. SGML tags).

A parse process 315 takes a segment as input and parses it into a source parse structure as described above in FIG. 2 (parser 215).

Next, an optional novel source evaluation module/process 320 takes the source parse structure as input and applies source evaluation rules to determine a source indication as described below in FIG. 4.

Note that in a preferred embodiment, a record is created in the summary file 260 after any given step in the process 300 that produces a component of the confidence measure.

Next, the translation and evaluation process 200 optionally performs a test 336, comparing the source indication with a threshold criterion. If the source indication fails to meet the threshold criterion, the processing of the segment is terminated, and the translation and evaluation process 200 performs a test 360 to see if there are more segments in the input file. If there are more segments, the translation and evaluation process 200 processes the next segment, looping into the segment process 310. If there are no more segments, the translation and evaluation process terminates. If the source indication meets the threshold criterion, the translation and evaluation process proceeds to the lexical transfer process 325A. The lexical transfer process 325A takes the source parse structure as input, and produces the initial transfer structure as output as described above in FIG. 2. The lexical transfer process 325A is a well known process.

Note that the test 336, or some variation of the test 336, is performed (see below) after any given step in the process 300 that produces a component of the confidence measure. In a preferred embodiment, these components are aggregated with the other components created in preceding steps of the process 300. Generally, it is this aggregation that is tested 336. Optionally, tests with different criteria, i.e., confidence measure threshold level tests 336 can be applied at each given step of the process 300. Note also that optionally each time after performing the test 336, or some variation of test 336, it is also possible to proceed in the translation process, regardless of the outcome of the test 336, and at the point of generating 340 the target language segment attach the aggregated confidence measure to the target language segment to show the confidence of the translation and evaluation module/process 200 in the translation.

Next, the translation and evaluation process 200 proceeds to an optional novel lexical transfer evaluation process 335A. The lexical transfer evaluation module 335A creates a transfer indication as described below in FIG. 5.

Next, the translation and evaluation process 200 optionally performs the test 336, comparing a complexity comprising, as an example, any one or more of the source indication and the transfer indication with a threshold criterion. If the complexity fails to meet the threshold criterion, the processing of the segment is terminated, and the translation and evaluation process 200 determines 360 whether there are more segments in the input file 205. If there are more segments, the translation and evaluation process 200 processes the next segment, looping into the segment process 310. If there are no more segments, the translation and evaluation process terminates. If the complexity meets the threshold criterion 336, the translation and evaluation process proceeds to the structural transfer process 325B. The structural transfer process 325B takes the initial transfer structure as input, and produces a target language structure as output as described above in FIG. 2. The structural transfer process 325B is a well known process.

Next, the translation and evaluation process 200 proceeds to an optional novel structural transfer evaluation process 335B. The structural transfer evaluation module creates a structural indication as described below in FIG. 6.

Next, the translation and evaluation process 200 optionally performs the test 336, comparing a complexity comprising, as an example, any one or more of the source indication, the transfer indication, and the structural indication with a threshold criterion. If the complexity fails to meet the threshold criterion, the processing of the segment is terminated, and the translation and evaluation process 200 determines 360 whether there are more segments in the input file 205. If there are more segments, the translation and evaluation process 200 processes the next segment, looping into the segment process 310. If there are no more segments, the translation and evaluation process terminates. If the complexity meets the threshold criterion, the translation and evaluation process 200 proceeds to an optional novel transfer time evaluation process 335C. The transfer time evaluation module creates a transfer time indication, e.g. a measure of time used, as described below in FIG. 7.

Next, the translation and evaluation process 200 optionally performs the test 336, comparing a complexity comprising, as an example, any one or more of the source indication, the transfer indication, the structural indication, and the transfer time indication with a threshold criterion. If the complexity fails to meet the threshold criterion, the processing of the segment is terminated, and the translation and evaluation process 200 determines 360 whether there are more segments in the input file 205. If there are more segments, the translation and evaluation process 200 processes the next segment, looping into the segment process 310. If there are no more segments, the translation and evaluation process terminates. If the complexity meets the threshold criterion, the translation and evaluation process proceeds to the target generation process 340. The target generation process 340 takes the target language structure as input and produces a target language segment as output as described above in FIG. 2. The target generation process 340 is a well known process. Next, the translation and evaluation process 200 proceeds to an optional novel target generation evaluation process 345. The target generation evaluation module creates a generation indication as described below in FIG. 8.

Next, the translation and evaluation process 200 performs a test 336, comparing a complexity comprising, as an example, any one or more of the source indication, the transfer indication, the structural indication, and the target generation indication with a threshold criterion. If the complexity fails to meet the threshold criterion, the processing of the segment is terminated, and the translation and evaluation process 200 determines 360 whether there are more segments in the input file 205. If there are more segments, the translation and evaluation process 200 processes the next segment, looping into the segment process 310. If there are no more segments, the translation and evaluation process terminates. If the complexity meets the threshold criterion, the translation and evaluation process proceeds to the output target segment process 350. The output target segment process 350 takes the target language structure as in put and produces a target language segment as output as described above in FIG. 2. The output target generation process 350 is a well known process.

When all segments of the input file 205 have been processed 360, the translation and evaluation process 200 terminates 370.

Figure 9:
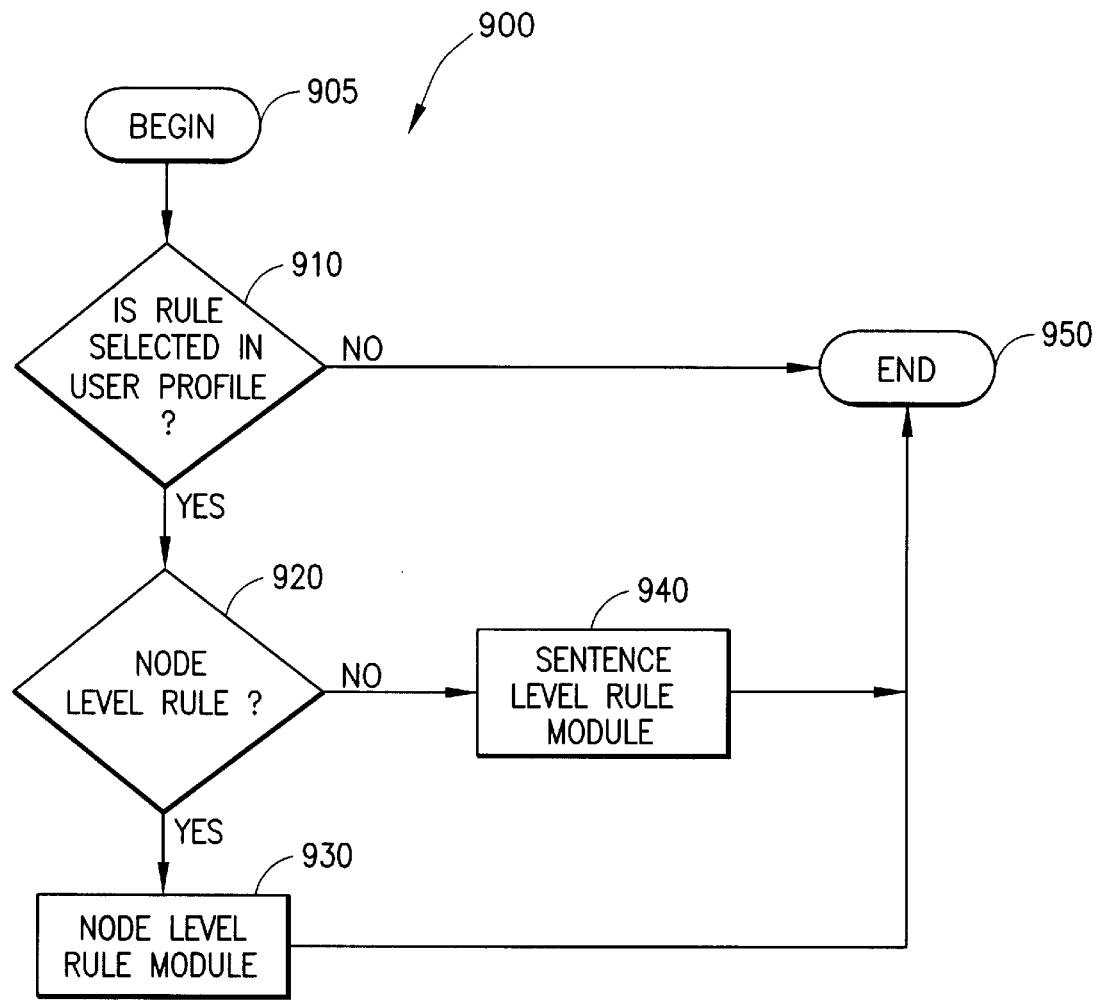
FIG. 9 is a flow diagram illustrating sequential operations of the present invention for applying an evaluation rule.

Note that each type of complexity typically can be classified either as a node level rule or a segment rule, as explained in FIG. 9.

Figure 4:
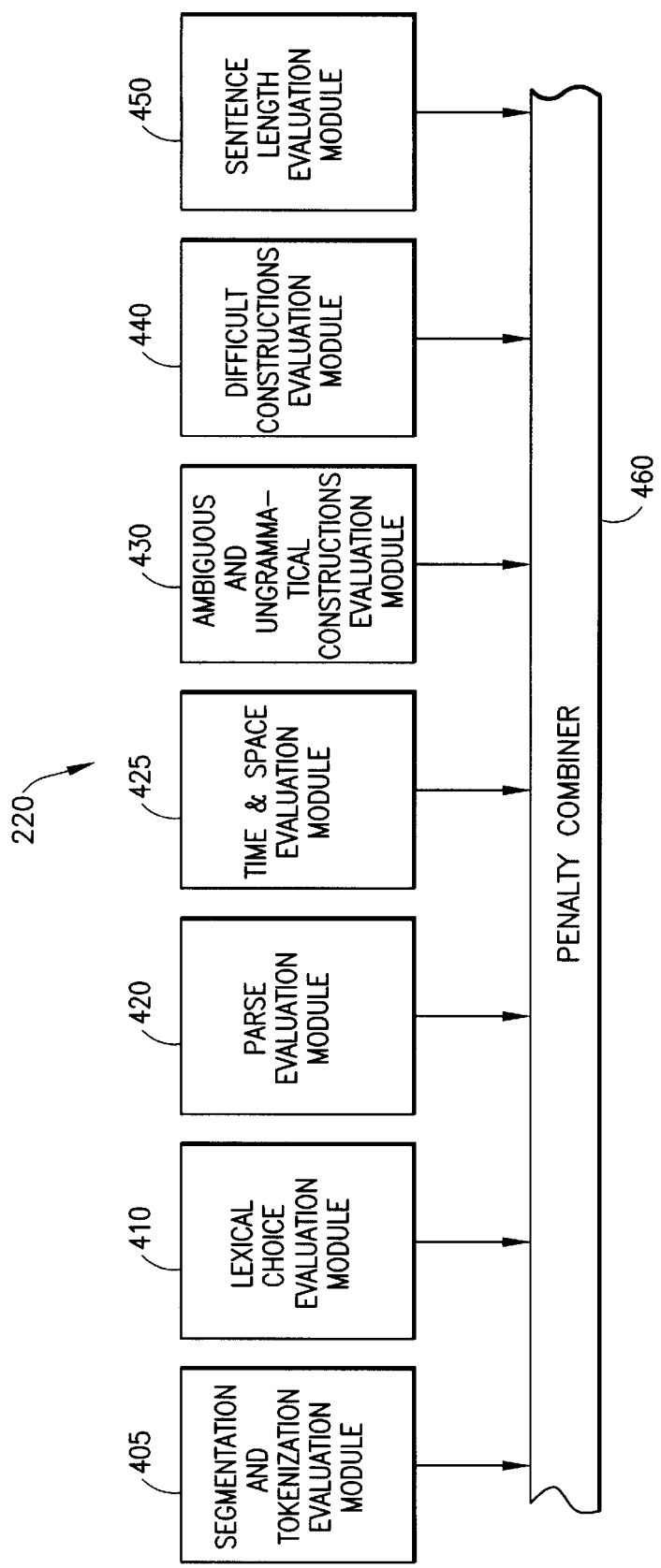
FIG. 4 is a block diagram representation of the source evaluation module of the present invention.

FIG. 4 is a block diagram representation of the source evaluation module 220 of the present invention.

The source evaluation module/process 220 is a novel process that generates a source indication of the complexity of choices in producing the source parse structure. Non-limiting examples of the complexity of choices can include one or any combination of: a complexity of segmenting and tokenizing the text 405, a complexity of lexical choice 410, a complexity of parse evaluation 420, a complexity of time and space used by the parser 425, a complexity of ambiguous constructions and ungrammatical constructions 430, a complexity of other constructions that are known to be difficult to parse correctly 440, and a complexity of sentence length 450.

The complexity of segmenting and tokenizing the text 405 measures complexities in choosing where to segment the input file 205 into NL segments and how to tokenize an NL segment into tokens. In step 405, rules are typically node level rules (see below FIGS. 9 and 10). Non-limiting examples of the complexity of choices can include any combination of: punctuation complexities, abbreviation complexities, and footnote complexities. For example, if a segment contains a semicolon, this semicolon could indicate the termination of a clause, or it could indicate an enumeration of e.g. noun phrases. For example, if the input file 205 contains an abbreviation ending with a period, the period may end the segment or it may not. For example, if a segment contains a footnote, the footnote may be a separate sentence, or it may be a part of the segment. Furthermore, the footnote may come at the end of the segment, or the footnote may divide the segment somewhere. The punctuation complexities, abbreviation complexities, and footnote complexities create a complexity for the segmentation process 310 in segmenting the NL text in the input file 205 into segments usable for the translation parser 215.

In a preferred embodiment, information about punctuation is available in the parse structure. This is well known.

In a preferred embodiment, the complexity of a punctuation includes any one or more of the following non-limiting rules: Look in the parse structure of the segment for occurrences of dashes, semicolons, and double quotes.

The preferred embodiment is programmed in the C language. The following is a pseudo-code representation of the programming of this function:

```
for (each-token) {
    if (member(token,problematic-punctuation)) {
        get(penalty-value);
        call-penalty-combiner(penalty-value);
        write-to-summary-file;
    }
}
```

In this code, we run through a list of tokens and for each token test if the token is one of the problematic types of punctuation, in which case we get the appropriate penalty value from the user profile, call the penalty combiner 460 with the appropriate penalty, and write a suitable message to the summary file.

In a preferred embodiment, the complexity of an abbreviation includes any one or more of the following non-limiting rules: Look in the parse structure of the segment for occurrences of word senses that have the feature abbreviation.

In the following is a pseudo-code representation of the programming of this function:

```
for (each-token) {
    if (hasfeature(token,abbrev) {
        get(penalty-value);
        call-penalty-combiner(penalty-value);
        write-to-summary-file;
    }
}
```

In this code, we run through a list of tokens and for each token test if the token has the feature abbrev, in which case we get the appropriate penalty value from the user profile, call the penalty combiner 460 with the appropriate penalty, and write a suitable message to the summary file.

In a preferred embodiment, the complexity of a footnote includes any one or more of the following non-limiting rules: Look in the parse structure of the segment for occurrences of formatting tags that indicate the beginning of a footnote.

In the following is a pseudo-code representation of the programming of this function:

```
for (each-token) {
   if (hastag(token,footnote-tag) {
      get(penalty-value);
      call-penalty-combiner(penalty-value);
      write-to-summary-file;
   }
}
```

In this code, we run through a list of tokens and for each token test if the token has the formatting tag footnote-tag, in which case we get the appropriate penalty value from the user profile, call the penalty combiner 460 with the appropriate penalty, and write a suitable message to the summary file.

The complexity of lexical choice 410 measures complexities in making correct lexical choices for each word in the input segment. Step 410 rules are typically node level rules (see below FIGS. 9 and 10). For example, the English word level may be a singular noun, or it may be a plural verb in the present tense, or it may be an infinitive verb, or it may be an imperative verb, or it may be an adjective. The possible combinations of parts of speech, grammatical functions, and inflectional, syntactic and semantic features make up the lexical analysis for each word.

Non-limiting examples of the complexity of choices can include any combination of: number of lexical analyses per word, number of different parts of speech, and ambiguous combinations of parts of speech.

In a preferred embodiment, morpholexical information is available in a complex structure, whose content results from the interaction between a morphological analyzer and the information for each word given in the source dictionary file 205. This is well known.

In a preferred embodiment, the complexity of a number of lexical analyses includes any one or more of the following non-limiting rules: Look in the complex structure of lexical analyses and determine the total number of lexical analyses.

In the following is a pseudo-code representation of the programming of this function:

```
for (each-word) {
   lexical-analysis-counter=0;
   for (each-lexical-analysis) {
      lexical-analysis-counter=lexical-analysis-counter+1;
   }
   get(penalty-value);
   call-penalty-combiner(penalty-value);
   write-to-summary-file;
}
```

In this code, we run through a list of lexical analyses, and for each lexical analysis we increment the counter for the number of lexical analyses; after getting the total number of lexical analyses, we get the appropriate penalty value from the user profile, call the penalty combiner 460 with the appropriate penalty, and write a suitable message to the summary file.

In a preferred embodiment, the complexity of a number of different parts of speech includes any one or more of the following non-limiting rules: For each word, look in the complex structure for each lexical analysis and determine the total number of possible parts of speech.

In the following is a pseudo-code representation of the programming of this function:

```
for (each-word) {
   part-of-speech-counter=0;
   not-already-encountered(all-parts-of-speech)=true;
   for (each-lexical-analysis) {
      get (part-of-speech);
      if (not-already-encountered(part-of-speech)) {
         part-of-speech-counter=part-of-speech-counter+1;
         not-already-encountered(part-of-speech)=false;
         get(penalty-value);
         call-penalty-combiner(penalty-value);
         write-to-summary-file;
      }
   }
}
```

In this code, we run through a list of word tokens and for each word token first initialize a counter of parts of speech to 0 and initialize boolean variables for each part of speech to true, indicating that we have not encountered this part of speech. Then, we run through a list of lexical analyses for the word and get the part of speech for each analysis; next, we test if the part of speech has already been encountered. If it has not been encountered, we increment the counter for number of parts of speech, change the value of the boolean variable to indicate that we have now encountered this part of speech, get the appropriate penalty value from the user profile, call the penalty combiner 460 with the appropriate penalty, and finally we write a suitable message to the summary file.

In a preferred embodiment, the complexity of an ambiguous combination of parts of speech includes any one or more of the following non-limiting rules: For any pair of two consecutive word tokens consisting of word 1 followed by word 2, look for the following combinations of possible parts of speech:

Word 1: Singular noun, and word 2: Singular verb.

Example: Asparagus spears.

Word 1: Determiner and pronoun, and word 2: Noun and verb.

Example: His challenge.

Word 1: Infinitive/imperative verb and singular noun, and word 2: Singular noun or plural noun.

Example: File cabinets.

Word 1: Adjective and singular noun, and word 2: Singular noun or plural noun.

Example: level gun.

Word 1: Infinitive/imperative verb and adjective, and word 2: Plural noun.

Example: level guns.

Word 1: Singular proper noun, and word 2: Singular noun or plural noun.

Example: He gives John trouble.

First word in the segment is "to", and the second word can be both an infinitive verb and a singular noun.

In the following is a pseudo-code representation of the programming of this function:

```
for (each-word-token) {
   word1pos=get-part-of-speech(word-token);
   word2pos=get-part-of-speech(next(word-token));
   if (ambiguous-combination(word1pos,word2pos)) {
      get(penalty-value);
      call-penalty-combiner(penalty-value);
      write-to-summary-file;
   }
}
```

In this code, we run through a list of word tokens and for each word token first get its part of speech, and then we get the part of speech for the next word token; if we have an ambiguous combination of parts of speech, we get the appropriate penalty value from the user profile, call the penalty combiner 460 with the appropriate penalty, and write a suitable message to the summary file.

The complexity of parse evaluation score 420 measures complexities in the evaluation of a parse by a parser. Step 420 rules are typically segment rules (see below FIGS. 9 and 11). In a preferred embodiment, the parser 215 will apply one or more well known procedures for evaluating the parse and produce a parse evaluation score.

In a preferred embodiment, the complexity of a parse evaluation score 420 includes any one or more of the following non-limiting rules: the parse evaluation score itself, optionally divided by sentence length (to make up for the fact that parse scores tend to get worse as sentence length increases); input segments that cannot be assigned a parse; input segments parsing with missing obligatory complements; number of parses of the input segment; two or more parses of an input segment that have identical parse evaluation scores; two or more parses of an in-put segment that have very close parse evaluation scores as defined by a suitable threshold.

In a preferred embodiment, the parser 215 assigns a parse evaluation score, including information about non-parsed segments etc as described above, for each parse, to a complex structure available to the translation and evaluation process 200. This is a well known process.

In the following is a pseudo-code representation of the programming of the function of evaluating a complexity of parse evaluation score 420:

```
for (each-segment) {
   parse1=get(best-parse-score);
   if (
      incomplete(parse1) or
      missing-complements(parse1)
   ) {
      get(penalty-value);
      call-penalty-combiner(penalty-value);
      write-to-summary-file;
   }
   else {
      get(number-of-parses);
      get(penalty-value);
      call-penalty-combiner(penalty-value);
      write-to-summary-file;
      parse2=get(next-best-parse-score);
      if (parse1==parse2) {
         get(penalty-value);
         call-penalty-combiner(penalty-value);
         write-to-summary-file;
      }
      else if (distance(parse1,parse2)<p-threshold) {
         get(penalty-value);
         call-penalty-combiner(penalty-value);
         write-to-summary-file;
      }
   }
}
```

In this code, we look at the parse evaluation score information for each segment. First, we get the parse evaluation score for the best parse and assign it to the variable parse1 . If the best parse evaluation score indicates a non-parsed segment, or a segment with unfilled obligatory slots, then we get the appropriate penalty value from the user profile, call the penalty combiner 460 with the appropriate penalty, and finally we write a suitable message to the summary file.

Else, we get the number of parses, get the appropriate penalty value from the user profile, call the penalty combiner 460 with the appropriate penalty, and write a suitable message to the summary file. Next, we get the parse evaluation score for the second best parse and assign it to the variable parse2. If parse1 and parse2 are equal, i.e. the parse scores of the two highest-ranked parses are identical, we get the appropriate penalty value from the user profile, call the penalty combiner 460 with the appropriate penalty, and write a suitable message to the summary file. Else, if the distance between parse1 and parse2 is less than a suitable constant p-threshold, we get the appropriate penalty value from the user profile, call the penalty combiner 460 with the appropriate penalty, and write a suitable message to the summary file.

The complexity of a time and a space usage 425 measures complexities in the time and memory space used by the computer system 100 for the parsing process. Step 425 rules are typically segment rules (see below FIGS. 9 and 11).

In a preferred embodiment, the parser 215 will apply one or more well known procedures for producing numbers indicating the time and memory space used by the computer system 100 for the parsing process and make these numbers available to the translation and evaluation process 200 in a complex structure.

In a preferred embodiment, the complexity of a time and a space usage 425 includes any one or more of the following non-limiting rules: a complexity of time spent on lexical analysis; a complexity of time spent on syntactic analysis; a complexity of space usage for pointers and numbers; a complexity of space usage for strings. As time and space usage tends to increase with segment length, time and space usage may optionally be divided by segment length.

In the following is a pseudo-code representation of the programming of the function of evaluating a complexity of time and space usage 425:

```
for (each-segment) {
   get(lexical-analysis-time);
   get(penalty-value);
   call-penalty-combiner(penalty-value);
   write-to-summary-file;
   get(syntactic-analysis-time);
   get(penalty-value);
   call-penalty-combiner(penalty-value);
   write-to-summary-file;
   get(pointer-space);
   get(penalty-value);
   call-penalty-combiner(penalty-value);
   write-to-summary-file;
   get(string-space);
   get(penalty-value);
   call-penalty-combiner(penalty-value);
   write-to-summary-file;
}
```

In this code, we first get the time spent on lexical analysis, get the appropriate penalty value from the user profile, call the penalty combiner 460 with the appropriate penalty, and write a suitable message to the summary file.

Next, we get the time spent on syntactic analysis, get the appropriate penalty value from the user profile, call the penalty combiner 460 with the appropriate penalty, and write a suitable message to the summary file.

Next, we get the space used for pointers and numbers, get the appropriate penalty value from the user profile, call the penalty combiner 460 with the appropriate penalty, and write a suitable message to the summary file.

Finally, we get the space used for strings, get the appropriate penalty value from the user profile, call the penalty combiner 460 with the appropriate penalty, and write a suitable message to the summary file.

The complexity of a difficult construction 440 measures complexities in constructions that are known to be difficult to translate correctly. Step 440 rules are typically node level rules (see below FIGS. 9 and 10).

In a preferred embodiment, the complexity of a difficult construction 440 includes any one or more of the following non-limiting rules: look for for-to constructions, e.g. "it is easy for you to do this", "this is easy for you to say"; look for prepositions without a prepositional object, e.g. "He eats with"; look for time references, e.g. "next year", "March First"; look for conjunctions, e.g. "and".

In the following is a pseudo-code representation of the programming of the function of evaluating a difficult construction 440:

```
for (each-token) {
  if (sense(token)=="forto" or
    (
    sense(token)=="for" and
    slot(token)==preposition and
    exists(token=="to")
    )
  ) {
    get(penalty-value);
    call-penalty-combiner(penalty-value);
    write-to-summary-file;
  }
  if (slot(token)==preposition and unfilled-slot(token)) {
    get(penalty-value);
    call-penalty-combiner(penalty-value);
    write-to-summary-file;
  }
  if (time-reference(token)) {
    get(penalty-value);
    call-penalty-combiner(penalty-value);
    write-to-summary-file;
  }if (conjunction(token)) {
    get(penalty-value);
    call-penalty-combiner(penalty-value);
    write-to-summary-file;
  }
}
```

In this code, we first check for a for-to construction. This construction is signalled by the parser either by being parsed as a for-to construction, as indicated by the forto-sense, or by the occurrence of the preposition for in connection with the word token to. If there is a for-to construction, we get the appropriate penalty value from the user profile, call the penalty combiner 460 with the appropriate penalty, and write a suitable message to the summary file. Next, if there is an occurrence of a preposition, whose slot is unfilled, we get the appropriate penalty value from the user profile, call the penalty combiner 460 with the appropriate penalty, and write a suitable message to the summary file. Next, if there is a time reference, we get the appropriate penalty value from the user profile, call the penalty combiner 460 with the appropriate penalty, and write a suitable message to the summary file. Finally, if the token is a conjunction, get the appropriate penalty value from the user profile, call the penalty combiner 460 with the appropriate penalty, and write a suitable message to the summary file.

The complexity of an ambiguous construction and of an ungrammatical construction 430 measures complexities in the style and grammaticality of a segment. Step 430 rules are typically node level rules (see below FIGS. 9 and 10).

In a preferred embodiment, the complexity of an ambiguous construction and of an ungrammatical construction process 430 uses one or more well known procedures for evaluating the style and grammaticality of a segment.

In a preferred embodiment, the complexity of an ambiguous construction and of an ungrammatical construction process 430 includes any one or more of the following non-limiting rules: look for unknown words, i.e. word tokens that are not found in the source dictionary file 210; look for missing subject, e.g. "makes a file"; look for missing hyphens, e.g. "a user created file"; look for lack of subject-verb agreement, e.g. "we goes"; look for wrong comparative or superlative forms of adjectives, e.g. "the more big mouse", "the wonderfuller cat", "the most big mouse", "the wonderfullest cat"; look for lack of capitalization of first word in segment (this may imply wrong segmentation); look for many nouns in a row, e.g. "power supply message queue system value"; look for missing "that", e.g. "she believes it is good"; look for passive constructions, e.g. "the mouse was caught by the cat"; look for non-parallelism in coordination, e.g. "The time and when you want to go"; look for nonfinite verbs, e.g. "A message is sent to the operator requesting the correct tape volume"; look for potentially wrong modifications in subjectless verb phrases, e.g. "As a baboon who grew up wild in the jungle, I realized that Wiki had special nutritional needs"; look for strings of the preposition "of" and nouns, e.g. "the beginning of the problem of the gathering of information"; look for double ambiguous passives, e.g. "Two cars were reported stolen by the Groveton police yesterday". These rules are all covered by a system like EasyEnglish, described in Bernth, A.: "EasyEnglish: A Tool", Bernth, A.: "EasyEnglish: Preprocessing", and Bernth, A.: "EasyEnglish: Addressing".

The complexity of a sentence length 450 measures complexities in the length of a segment. Both segments that are very short and segments that are very long increase the complexity. Step 450 rules are typically segment rules (see below FIG. 9 and 11).

In a preferred embodiment, the parser 215 makes the length of a segment available to the translation and evaluation process 200. The length is given as e.g. the number of words in the segment.

In a preferred embodiment, the complexity of a difficult construction 450 includes any one or more of the following non-limiting rules: Penalize the length of a segment according to some categories of a length. Non-limiting examples of these lengths may be: Penalize segments of 4 words or less the most, e.g. 30; do not penalize segments of 5 to 20 words at all, e.g. 0; penalize segments of 21 to 25 words e.g. 7; penalize segments of 26 to 30 words e.g. 10; penalize segments of 31 words or more e.g. 15.

In the following is a pseudo-code representation of the programming of the function of evaluating a complexity of time and space usage 440:

```
for (each-segment) {
  if (sent-len(segment)<=4) {
    get(penalty-value);
    call-penalty-combiner(penalty-value);
    write-to-summary-file;
  }
  else if (sent-len(segment)>4 and sent-len(segment)<21)
  {
    get(penalty-value);
    call-penalty-combiner(penalty-value);
    write-to-summary-file;
  }
  else if (sent-len(segment)>20 and sent-len(segment)
    <26) {
    get(penalty-value);
```

```
        call-penalty-combiner(penalty-value);
        write-to-summary-file;
    }
    else if (sent-len(segment)>25 and sent-len(segment)
        <31) {
        get(penalty-value);
        call-penalty-combiner(penalty-value);
        write-to-summary-file;
    }
    else {
        get(penalty-value);
        call-penalty-combiner(penalty-value);
        write-to-summary-file;
    }
}
```

In this code, we check that the segment falls into a specific interval, and then we get the appropriate penalty value for that interval from the user profile, call the penalty combiner 460 with the appropriate penalty, and write a suitable message to the summary file.

The penalty combiner 460 aggregates a penalty of a complexity with the other penalties created in preceding steps of the process 300 to produce a single measure of the complexity of translation.

In a preferred embodiment, the penalty combiner 460 stores the aggregated penalty in a variable available to the translation and evaluation process 200. Every time a call is made to the penalty combiner 460, the new penalty is added to the aggregated penalty. Note that some penalties might not be aggregated, e.g., if they are not designed in the system or if their weight in the profile is chosen as zero.

In the following is a pseudo-code representation of the programming of the function of combining penalties 460:

```
    call-penalty-combiner(penalty-value) {
        aggregated-penalty=aggregated-penalty+penalty-
            value;
    }
```

In this code, we add the value of penalty-value to the existing aggregated penalty aggregated-penalty.

Figure 5:
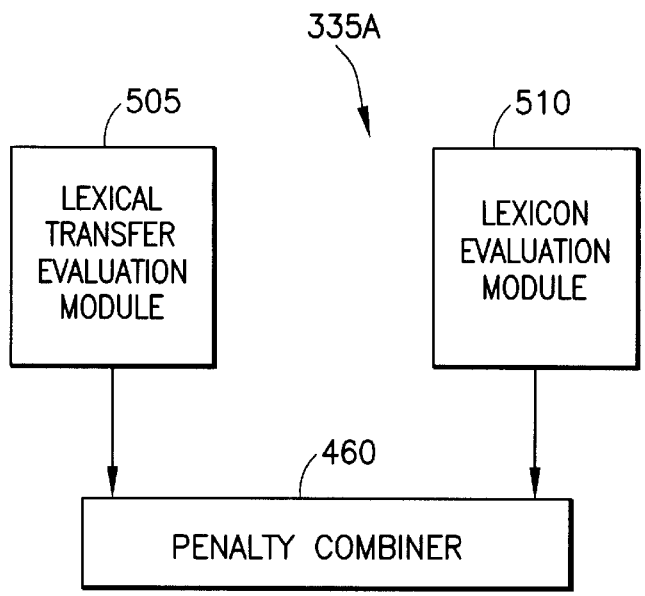
FIG. 5 is a block diagram representation of the lexical transfer evaluation module of the present invention.

FIG. 5 is a block diagram representation of the lexical transfer evaluation module 335A of the present invention.

The lexical transfer evaluation module/process 335A is a novel process that generates a transfer indication of the complexity of choices in producing the initial transfer structure. Non-limiting examples of the complexity of choices can include any combination of: a complexity of lexical transfer 505, and a complexity of lexicon 510.

The complexity of lexical transfer 505 measures complexities in transfer of source elements to target elements and creation of target relationships. Step 505 rules are typically node level rules (see below FIGS. 9 and 10).

In a preferred embodiment, the complexity of lexical transfer 505 includes any one or more of the following non-limiting rules: look for lack of transfer; look for many transfers. For example, if a source word in the source dictionary 210 does not have a corresponding entry in the transfer dictionary file 230, it is impossible for the translation and evaluation module 200 to translate this word. Similarly, if a source word in the source dictionary 210 has more than one transfer, the translation and evaluation module 200 needs to make a decision as to which transfer to use.

In the following is a pseudo-code representation of the programming of this function:

```
    for (each-word-token) {
        if (proper-noun(token)) return;
        else if (number-of-transfers(token)==0) {
            get(penalty-value);
            call-penalty-combiner(penalty-value);
            write-to-summary-file;
        }
        else if (number-of-transfers(token)>1) {
            get(penalty-value);
            call-penalty-combiner(penalty-value);
            write-to-summary-file;
        }
    }
```

In this code, we run through the list of word tokens and for each token check if it is a proper noun. If the token is a proper noun, this rule does not apply, and we return. Else if there is no transfer, we get the appropriate penalty value from the user profile, call the penalty combiner 460 with the appropriate penalty, and write a suitable message to the summary file. Else if there are several transfers, e.g. more than 1, then we get the appropriate penalty value from the user profile, call the penalty combiner 460 with the appropriate penalty, and write a suitable message to the summary file.

The measure of relevance of a lexicon 510 measures the relevance of a lexicon used for target word choice. Step 510 rules are typically node level rules (see below FIGS. 9 and 10). In a preferred embodiment, the target dictionary file 230 may be split up into a number of hierarchical dictionaries. A non-limiting example of the complexity of choices can include: If a target word is found in a specific dictionary, the confidence measure may increase or decrease.

In the following is a pseudo-code representation of the programming of this function:

```
    for (each-word-token) {
        get(transfer-dict(word-token));
        get(penalty-value);
        call-penalty-combiner(penalty-value);
        write-to-summary-file;
    }
```

In this code, we run through the list of word tokens, and for each word get the name of the transfer dictionary that supplied the transfer. Then we get the appropriate penalty value from the user profile, call the penalty combiner 460 with the appropriate penalty, and write a suitable message to the summary file.

Figure 6:
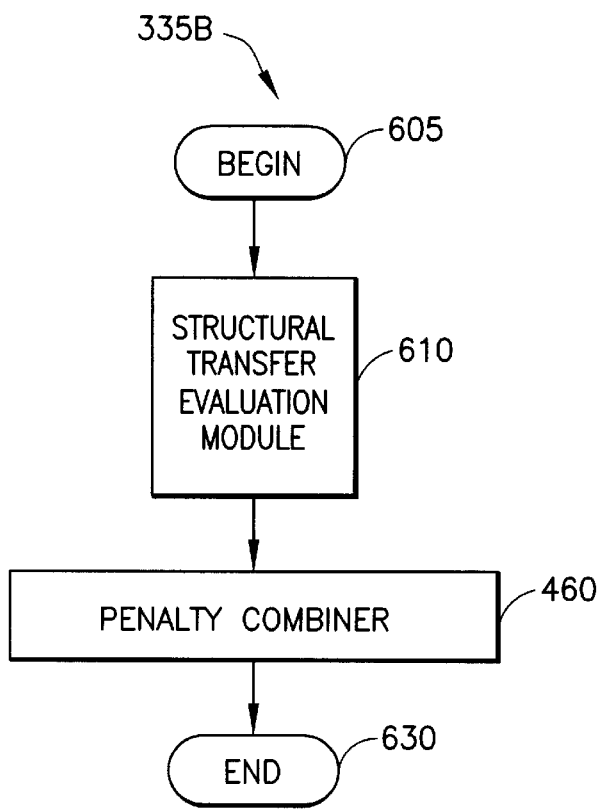
FIG. 6 is a block diagram representation of the structural transfer evaluation module of the present invention.

FIG. 6 is a block diagram representation of the structural transfer evaluation module/process 335B of the present invention.

The structural transfer evaluation module 335B is a novel process that generates a structural indication of the complexity of a transformation. Step 335C rules are typically node level rules (see below FIGS. 9 and 10). A non-limiting example of the complexity of a transformation is: Look for the application of a specific transformation.

In a preferred embodiment, the structural transfer process 325B makes available information about which transformations apply, to the translation and evaluation 200 process in a variable.

In the following is a pseudo-code representation of the programming of this function:

```
    for (each-applied-transformation) {
        get(penalty-value);
        call-penalty-combiner(penalty-value);
        write-to-summary-file;
    }
```

In this code, after beginning 605 (e.g. by being called by the structural transfer process 325B for each transformation), we get 610 the appropriate penalty value from the user profile 305, call the penalty combiner 460 with the appropriate penalty, and write a suitable message to the summary file. When all applied transformations have been processed, the structural transfer evaluation module/process 335B ends in 630.

Figure 7:
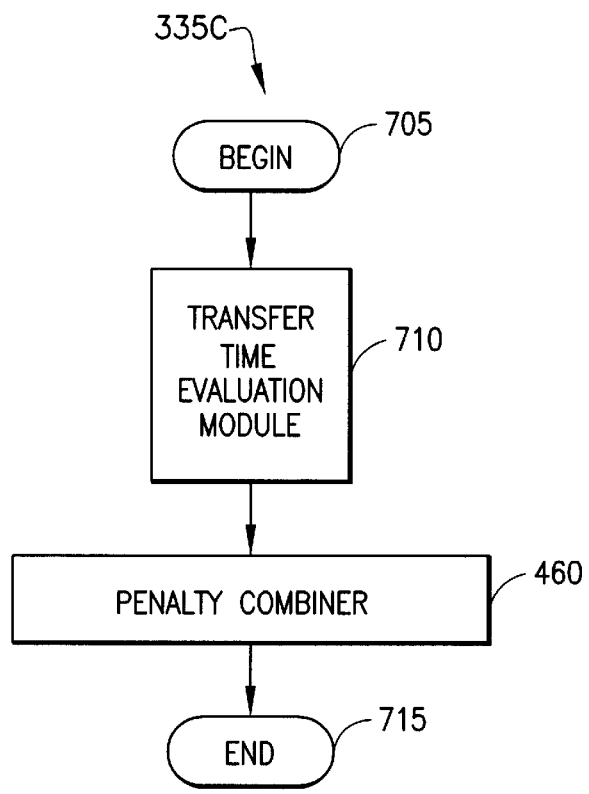
FIG. 7 is a block diagram representation of the time spent on transfer evaluation module of the present invention.

FIG. 7 is a block diagram representation of the time spent on transfer evaluation module/process 335C of the present invention.

The time spent on transfer evaluation module/process 335C is an optional novel process that generates a transfer indication of the measure of the time used by transfer process 225.

The complexity of time spent on transfer 335C measures complexities 710 in the time used by the computer system 100 for the transfer process 225. In a preferred embodiment, the transfer process 225 will apply one or more well known procedures for producing numbers indicating the time used by the computer system 100 for the transfer process, make these numbers available to the translation and evaluation process 200 in a complex structure which sends the numbers to the penalty combiner as described above, and then ends 715.

In a preferred embodiment, the complexity of a time usage 335C includes any one or more of the following non-limiting rules: a complexity of time spent on lexical transfer; and a complexity of time spent on structural transfer.

In the following is a pseudo-code representation of the programming of this function:

```
for (each-segment) {
    get(lexical-transfer-time);
    get(penalty-value);
    call-penalty-combiner(penalty-value);
    write-to-summary-file;
}
```

In this code, we first get the time spent on lexical transfer, get the appropriate penalty value from the user profile, call the penalty combiner 460 with the appropriate penalty, and write a suitable message to the summary file. Then we get the time spent on structural transfer, get the appropriate penalty value from the user profile, call the penalty combiner 460 with the appropriate penalty, and write a suitable message to the summary file.

Figure 8:
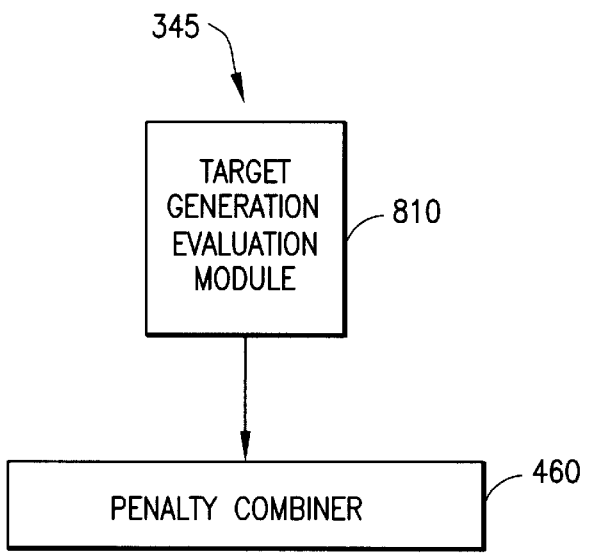
FIG. 8 is a block diagram representation of the target generation evaluation module of the present invention.

FIG. 8 is a block diagram representation of the target generation evaluation module 345 of the present invention.

The target generation evaluation module/process 345 is an optional novel process that generates 810 a generation indication of the complexity of choices in producing a target sentence from the target language structure. Step 345 rules are typically node level rules (see below FIGS. 9 and 10). Non-limiting examples of the complexity of choices can include any combination of: a complexity of highly inflected target parts of speech; a complexity of capitalization; and a complexity of punctuation.

The complexity of highly inflected target parts of speech measures complexities in inflecting a word of a given target part of speech. A wrong feature stemming from a mistake in one of the previous steps of the translation and evaluation process 200 may cause bad inflection for highly inflected parts of speech. In a preferred embodiment, highly inflected target parts of speech may be given a profile setting in the user profile and be penalized accordingly.

In the following is a pseudo-code representation of the programming of this function:

```
for (each-word-token) {
    get(target-part-of-speech);
    get(penalty-value);
    call-penalty-combiner(penalty-value);
    write-to-summary-file;
}
```

In this code, for each word token, we get its part of speech, get the appropriate penalty value from the user profile, call the penalty combiner 460 with the appropriate penalty, and write a suitable message to the summary file.

The complexity of capitalization measures complexities in proper capitalization of a target sentence. For example, in German, normally, not only the first word of a sentence is capitalized, but also all nouns. This is a highly language-specific issue, so each language needs individual treatment.

In a preferred embodiment, a non-limiting example of a rule for capitalization may be: Penalize each segment according to a setting in the user profile.

In the following is a pseudo-code representation of the programming of this function:

```
for (each-segment) {
    get(penalty-value);
    call-penalty-combiner(penalty-value);
    write-to-summary-file;
}
```

In this code, we get the appropriate penalty value from the user profile, call the penalty combiner 460 with the appropriate penalty, and write a suitable message to the summary file.

The complexity of punctuation measures complexities in proper punctuation in a target sentence. Punctuation rules differ from language to language, e.g. the order of quotation marks and other punctuation like periods and commas. This is a highly language-specific issue, so each language pair needs individual treatment.

In a preferred embodiment, a non-limiting example of a rule for punctuation may be: Penalize each segment according to a setting in the user profile.

In the following is a pseudo-code representation of the programming of this function:

```
for (each-segment) {
    get(penalty-value);
    call-penalty-combiner(penalty-value);
    write-to-summary-file;
}
```

In this code, we get the appropriate penalty value from the user profile, call the penalty combiner 460 with the appropriate penalty, and write a suitable message to the summary file.

FIG. 9 is a flow diagram illustrating sequential operations 900 of the present invention for applying an evaluation rule.

Each evaluation rule in the present invention can be e.g. a node level rule or a segment rule. A node level rule may apply one or more times to each token in e.g. a source parse structure, initial transfer structure, or target language structure. Non-limiting examples of node level rules are the complexity of lexical choice 410 and the complexity of lexical transfer 505. A segment rule typically only applies once to the whole segment. Non-limiting examples of segment rules are time and space usage 425 and complexity of segment length 450.

In a preferred embodiment, after beginning 905 (e.g. by being called by the translation and evaluation module/ process 200), a test 910 determines if a rule is selected in the user profile. If the rule is not selected, the process terminates 950. If the rule is selected, a test 920 determines if the rule is a node level rule, in which case we proceed to node level evaluation rule 930 described below in FIG. 10. If the test 920 fails, we proceed to sentence level evaluation rule 940 described below in FIG. 11. After returning from 930 or 940, the process ends 950.

In the following is a pseudo-code representation of the programming of this function:

```
if (selected(rule)) {
    if (node-level-rule(rule)) {
        call-node-level-rule(rule);
    }
    else {
        call-sentence-level-rule(rule);
    }
}
else stop;
```

In this code, we test if a rule is selected in the user profile, in which case we test if it is a node-level rule. If it is a node-level rule, we call the node-level rule process; otherwise we call the sentence-level process. If the rule was not selected in the user profile, the process terminates.

Figure 10:
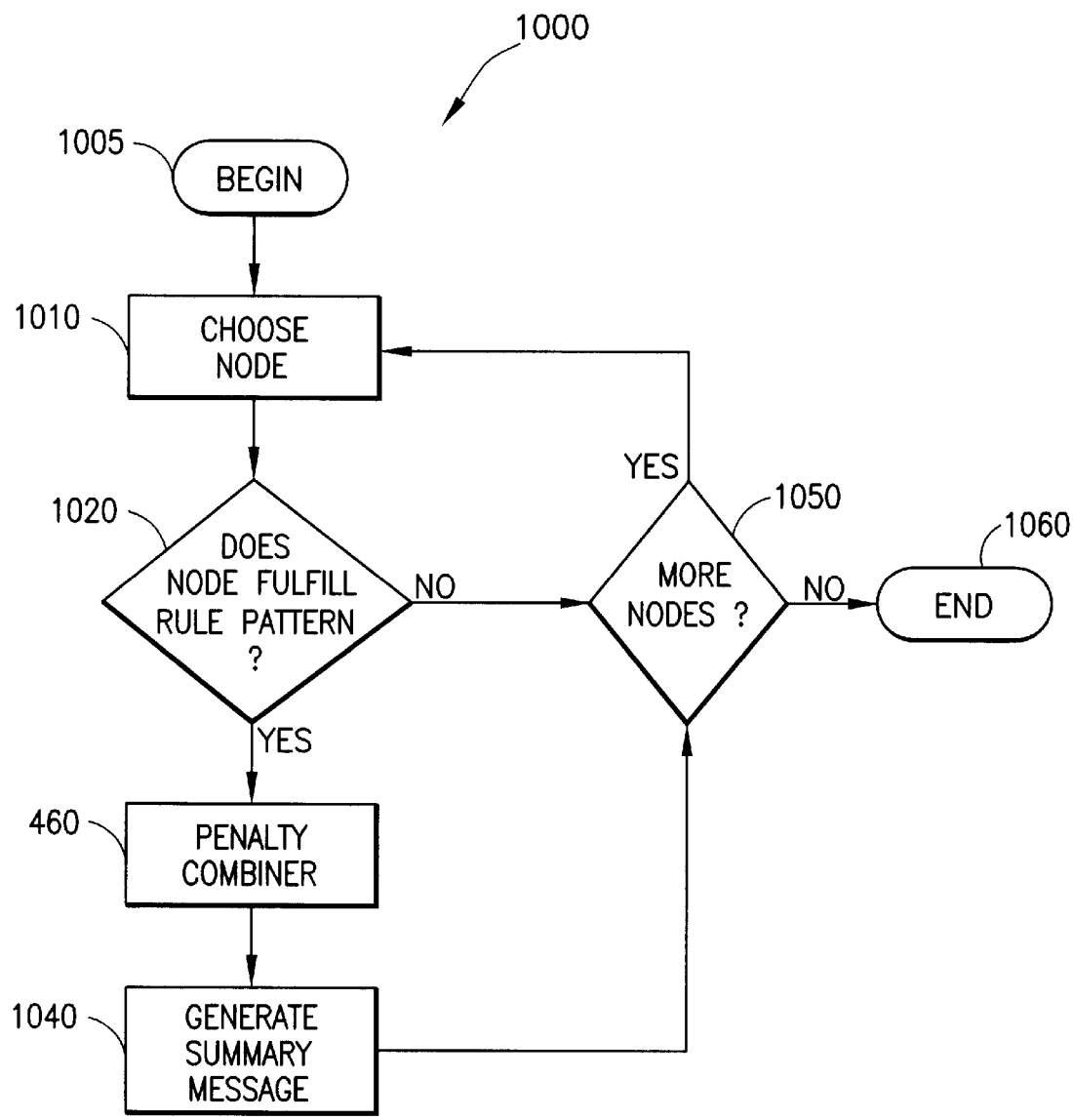
FIG. 10 is a flow diagram illustrating sequential operations of the present invention for applying a node level evaluation rule.

FIG. 10 is a flow diagram illustrating sequential operations 1000 of the present invention for applying a node level evaluation rule.

A node level rule may apply to each token in e.g. a source parse structure, initial transfer structure, or target language structure as explained above in FIG. 9.

In a preferred embodiment, we begin 1005, and first a node (token) is chosen 1010 in a relevant structure. Non-limiting examples of a relevant structure are: the source parse structure, initial transfer structure, or target language structure. If the conditions of the rule are fulfilled 1020 by the node, the penalty combiner 460 is called and a summary message is generated and written 1040 to the summary file. Next, a test 1050 determines if there are more nodes in the relevant structure, in which case we loop back into 1010. If the test 1020 fails, we go directly to the test 1050 to determine if there are more nodes in the relevant structure, in which case we loop back into 1010. When there are no more nodes in the relevant structure, the process ends 1060.

In the following is a pseudo-code representation of the programming of this function:

```
for (all-nodes) {
    NODE=choose-a-node;
    if (rule-match(NODE)) {
        call-penalty-combiner(penalty-value);
        write-to-summary-file;
    }
    else continue;
}
```

Figure 11:
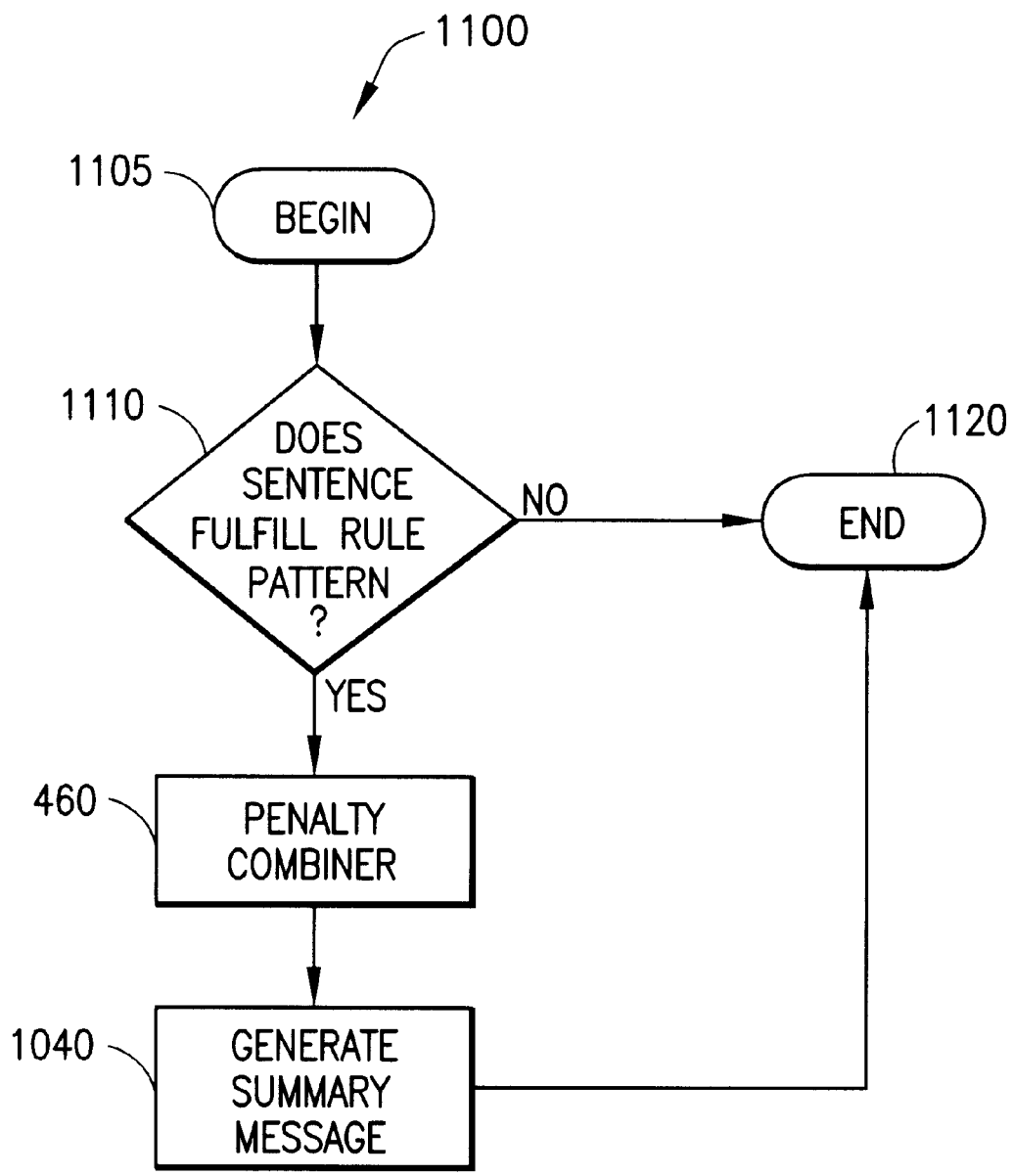
FIG. 11 is a flow diagram illustrating sequential operations of the present invention for applying a sentence level evaluation rule.

FIG. 11 is a flow diagram illustrating sequential operations 1100 of the present invention for applying a sentence level evaluation rule.

A segment rule typically only applies once to the whole segment (as explained above in FIG. 9).

In a preferred embodiment, after beginning 1105, a test 1110 determines whether the sentence fulfills the conditions of the rule pattern, in which case the penalty combiner 460 is called and a summery message is generated 1040. Then the process ends in 1120. If the test 1110 fails, the process terminates 1120.

In the following is a pseudo-code representation of the programming of this function:

```
if (rule-match(segment)) {
    call-penalty-combiner(penalty-value);
    write-to-summary-file;
}
```

Given this disclosure alternative equivalent embodiments will become apparent to those skilled in the art. These embodiments are also within the contemplation of the inventors.

We claim:

1. A computer system for natural language translation, comprising:
   a parser that parses a source natural language segment into a source parse structure with one or more source elements;
   a segment translation process that translates the source parse structure into a target natural language segment through a target language structure; and
   an evaluation process that determines a translation complexity of the computer system translating the source natural language segment to the target natural language segment and determines a confidence measure related to a parsing complexity that is a complexity of parsing the source natural language segment, where the confidence measure indicates less confidence as the parsing complexity increases.

2. A computer system for natural language translation, as in claim 1, where the segment translation process terminates if the confidence measure fails to meet a threshold criterion.

3. A computer system for natural language translation, as in claim 1, where the evaluation process determines the translation complexity by measuring a complexity of choices during the translating.

4. A computer system for natural language translation, as in claim 3, where the translation process terminates if the confidence measure fails to meet a threshold criterion.

5. A computer system for a natural language translation, comprising:
   a translation process that translates a source natural language segment of one or more source words into a target natural language segment of one or more target words;
   a parser that parses the source natural language segment into a source parse structure with one or more source elements including one or more syntactic relationships among the source elements; and
   an evaluation process that determines a translation complexity of the computer system translating from the source natural language segment to the target natural language segment by measuring a complexity of choices during the translating and measuring a parsing complexity of the parsing, and further determines a confidence measure of the natural language translation by a complexity combination of the complexity of choices and the parsing complexity, the confidence measure indicating less confidence as the complexity combination increases.

6. A computer system for natural language translation, as in claim 5, where the translation terminates if the confidence measure fails to meet a threshold criterion.

7. A computer system for natural language translation, comprising:
   a parser that parses a source natural language segment of one or more source words into a source parse structure with one or more source elements including syntactic relationships among the source elements;
   a source evaluation process that generates a source indication of a complexity of choices in producing the source parse structure;
   a transfer process that converts the source parse structure into an initial transfer structure in which source elements are replaced by target elements and target relationships are created;
   a transfer evaluation process that generates a transfer indication of a complexity of choices in producing the initial transfer structure;

a structural process that converts the initial transfer structure into a target language structure;

a structural transfer evaluation process that generates a structural indication of a complexity of converting the initial transfer structure into the target language structure;

a target generation process that converts the target language structure into a target natural language segment of one or more target words;

a target generation evaluation process that generates a generation indication of a complexity of the converting the target language structure into the target natural language segment; and a combiner that aggregates any one or more of the source indication, the transfer indication, the structural indication, and the generation indication to produce a single measure of the complexity of the translation by the computer system and determines a confidence measure of a natural language translation that indicates less confidence as the complexity increases.

8. A computer system for natural language translation, as in claim 7, where the translation process terminates if the confidence measure fails to meet a threshold criterion.

9. A system, as in claim 7, where the source indication includes a measure of a complexity of a punctuation.

10. A system, as in claim 7, where the source indication includes a measure of a complexity of an abbreviation.

11. A system, as in claim 7, where the source indication includes a measure of a complexity of a footnote.

12. A system, as in claim 7, where the source indication includes a measure of a complexity of a number of lexical analyses per word.

13. A system, as in claim 7, where the source indication includes a measure of a complexity of a number of different parts of speech.

14. A system, as in claim 7, where the source indication includes a measure of a complexity of an ambiguous combination of parts of speech.

15. A system, as in claim 7, where the source indication includes a measure of an ambiguous construction or ungrammatical construction of the source natural language.

16. A system, as in claim 7, where the source indication includes a measure of a complexity of a for-to construction.

17. A system, as in claim 7, where the source indication includes a measure of a complexity of a preposition without prepositional object.

18. A system, as in claim 7, where the source indication includes a measure of a complexity of a time reference.

19. A system, as in claim 7, where the source indication includes a measure of a complexity of a coordination.

20. A system, as in claim 7, where the source indication includes a measure of a complexity of a parse evaluation score.

21. A system, as in claim 7, where the source indication includes a measure of the amount of a time and a space usage.

22. A system, as in claim 7, where the source indication includes a measure of a complexity of a sentence length.

23. A system, as in claim 7, where the transfer indication includes a measure of a complexity of a lexical transfer.

24. A system, as in claim 7, where the transfer indication includes a measure of the relevance of a lexicon used for target word choice.

25. A system, as in claim 7, where the transfer indication includes a measure of a time used during transfer.

26. A system, as in claim 7, where the structural indication includes a measure of a complexity of a transformation.

27. A system, as in claim 7, where the generation indication includes a measure of a complexity of a target generation.

28. A method executed on a computer system for natural language translation, comprising the steps of:

parsing a source natural language segment into a source parse structure with one or more source elements;

translating the source parse structure into a target natural language segment through a target language structure;

determining a translation complexity of translating the source natural language segment to the target natural language segment; and determining a confidence measure related to a parsing complexity that is a complexity of parsing the source natural language segment, where the confidence measure indicates less confidence as the parsing complexity increases.

29. A computer system for natural language translation, comprising:

means for parsing a source natural language segment into a source parse structure with one or more source elements;

means for translating the source parse structure into a target natural language segment through a target language structure;

means for determining a translation complexity of translating the source natural language segment to the target natural language segment; and means for determining a confidence measure related to a parsing complexity that is a complexity of parsing the source natural language segment, where the confidence measure indicates less confidence as the parsing complexity increases.

* * * * *